United States Patent [19]
Zanoni

[11] 3,768,910
[45] Oct. 30, 1973

[54] DETECTING THE POSITION OF A SURFACE BY FOCUS MODULATING THE ILLUMINATING BEAM

[75] Inventor: Carl A. Zanoni, Middletown, Conn.

[73] Assignee: Zygo Corporation, Middletown, Conn.

[22] Filed: May 25, 1972

[21] Appl. No.: 256,693

[52] U.S. Cl............ 356/167, 356/4, 356/5, 356/118, 356/125, 250/219 DR, 250/235
[51] Int. Cl........... G01b 11/22, G01c 3/08
[58] Field of Search............ 356/4, 5, 118, 125, 356/126, 150, 167; 250/219 DR, 235

[56] References Cited
UNITED STATES PATENTS
| | | | |
|---|---|---|---|
| 2,968,994 | 1/1961 | Shurcliff | 356/126 X |
| 3,542,472 | 11/1970 | Smith-Vaniz | 356/4 |
| 3,714,524 | 1/1973 | Katsuyama | 356/125 X |

*Primary Examiner*—Ronald L. Wibert
*Assistant Examiner*—Paul K. Godwin
*Attorney*—Milton Zucker

[57] ABSTRACT

An optical sensor is described for providing an output responsive to the position of a test surface with respect to a predetermined plane. A beam of radiant energy is focused by a lens onto the test surface, while being modulated along its optical axis by a mirror oscillating at a desired frequency. The first harmonic of the radiant energy reflected from the test surface is then monitored as to phase and amplitude by a single photodetector to provide a measure of the direction and distance of the test surface from the determined plane. By adding a second oscillating mirror system, with a different frequency, and a slight offset in focal point, a second point on the object can be simultaneously measured to provide a measurement of the angularity of the surface with respect to the reference plane. An additional embodiment shows the use of polarized light to increase efficiency.

7 Claims, 8 Drawing Figures

Patented Oct. 30, 1973

4(a) TEST SURFACE IN FRONT OF $F_o$

4(b) TEST SURFACE BEHIND $F_o$

DETECTING THE POSITION OF A SURFACE BY FOCUS MODULATING THE ILLUMINATING BEAM

BACKGROUND OF THE INVENTION

1. Field of the Invention

The present invention relates to apparatus for the accurate measurement on a point-by-point basis of the distance from a reference plane to a surface. The device can be used to adjust the distance of an object from a defined surface. More particularly, the invention relates to optical apparatus for this type of measurement of either specularly-reflecting or diffusely-reflecting surfaces.

2. The Prior Art

For the accurate measurement of soft, delicate, hot, or moving surfaces, noncontacting sensors must be used. Prior-art devices of this character include capacitive gauges, eddy-current gauges, air gauges, spot interferometers and optical sensors. The nonoptical sensors cannot work at distances of more than a small fraction of an inch without loss of sensitivity.

Optical sensors have advantages due to the nature of light itself. The principal advantages are: (1) They do not require direct mechanical contact between the sensor and the object to be measured; (2) the surface over which the measurement is done can be very small — in some cases, only several square microns; (3) the distance from the sensor to the object to be measured can be large; (4) the response time is limited to that of the photodetector and its electronics; and (5) light variations are directly convertible to electrical signals.

Prior-art optical sensors employ various techniques, such as parallax, time elapse, triangulation, trilateration, autofocusing, stadimetry, and interferometry.

In the prior art of autofocusing optical noncontact sensors, the distance from the focal point was determined by one of two methods. Firstly, by effectively placing two photodetectors on the optical axis such that one is on one side of the focus and the other photodetector on the other side of the focus, the inequality of the photodetector outputs is proportional to the offset of the point centered between the detectors and the focal point. Furthermore, the sign of the difference indicates on which side of the focus the point centered between the detectors is located. When the photodetectors provide zero difference, the coincidence of the focus and the point centered between the two photodetectors is signified. However, since the difference in the output of the photodetectors is dependent on the gain of the system, the distance scale is dependent on the amount of light received by the photodetectors. Thus, distance measurements become sensitive to the constancy of the light-source output and the reflectivity of the test surface. In order to overcome these difficulties, some compensation can be effected by using an average of the two photodetector outputs to correct the distance scale.

Another method used to ascertain the distance of a test surface from the focal point is to monitor the amplitude and phase of the reflected rays with respect to their crossing or not crossing the optical axis.

OBJECTS OF THE INVENTION

In the present invention, an optical probe is utilized as part of an autofocusing system for providing error signals indicative of the distance of a surface under test from a known reference point.

It is therefore an object of the invention to provide an improved optical measuring apparatus for measuring the distance from a reference plane to a surface.

A further object of the invention is to provide an improved optical measuring apparatus of the character described without physically contacting the surface.

A further object of the invention is to provide an improved measuring apparatus useful for the measurement of either diffuse or reflecting surfaces.

A further object of the invention is to provide an improved optical measuring apparatus of the character described having the capacity for high resolution over large working distances.

A further object of the invention is to provide an improved optical measuring apparatus of the character described requiring only one photodetector.

A further object of the invention is to provide an improved optical measuring apparatus of the character described capable of simultaneously measuring a multiplicity of points arbitrarily closely spaced on the test surface.

A further object of the invention is to provide an improved optical measuring apparatus of the character described capable of providing a measure of normality of a test surface relative to an optical axis.

Yet another object of the invention is to provide an improved optical measuring apparatus of the character described including servo means for maintaining the apparatus at a selected distance from a test surface to provide thereby an indication of the distance of the test surface from a predetermined reference.

Other objects of the invention will be apparent from the following description taken in connection with the accompanying drawings, and its scope will be pointed out in the appended claims.

STATEMENT OF THE INVENTION

In accordance with the instant invention, I provide a source of radiant energy (most preferably light from a laser) which is focused onto a reflecting surface whose position is to be measured with respect to a predetermined reference plane, means, most preferably an oscillating mirror, for modulating the radiant energy at a desired frequency along its optical axis, means for collecting the radiant energy reflected from the test surface onto a single photodetector, and means for monitoring the first harmonic of said reflected radiant energy to obtain information with respect to the direction and amplitude of the distance between the test surface and the reference plane.

This invention also includes means for determining the angle of the plane of the test surface with respect to the reference plane, which includes a second modulating means which oscillates at a frequency different from the first modulating means, set so as to laterally offset the focus of the light at a predetermined distance from the first focus; the reflected energies from the two offset beams of different frequency are collected in the same photodetector, and are then separated by means of the frequency difference and measured separately; the difference in distances from the reference plane, and the offset, provide a measure of the inclination of the plane of the object being measured.

Most preferably, the light source is a gas laser which produces polarized light, whereby the efficiency of the device can be enhanced by the use of suitable auxiliary devices which deliver substantially all of the incident energy onto the photodetector.

THE DRAWINGS

Figure 4:
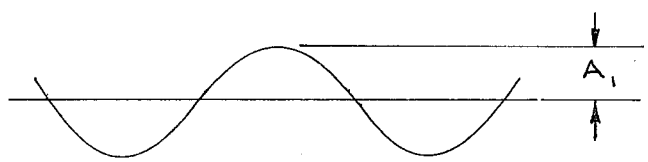
Figure 4:
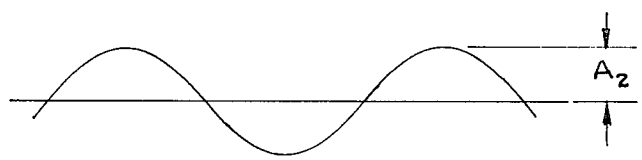
Figure 5:
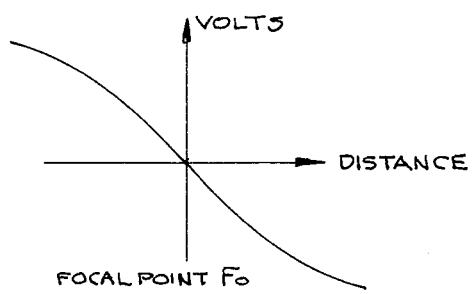
Figure 3:
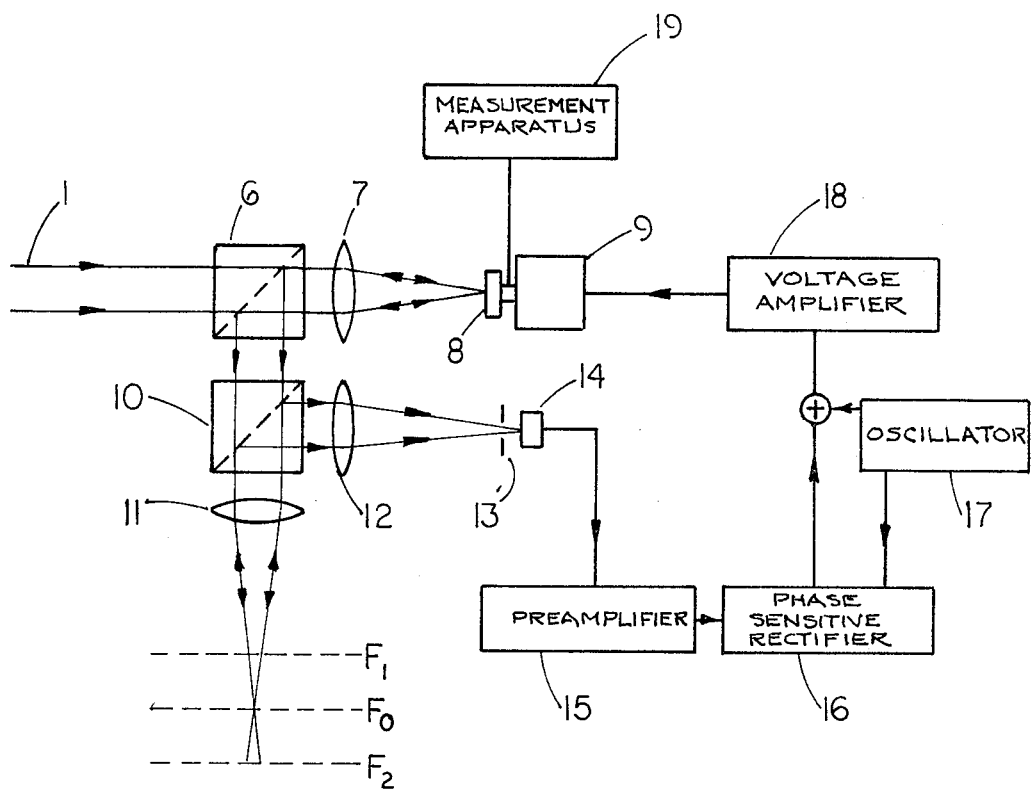
FIG. 3 is a schematic block diagram of an optical measuring apparatus of a preferred embodiment of the invention.

FIGS. 4 (a) and (b) and FIG. 5 are graphs illustrating aspects of the operation of the apparatus in FIG. 3.

Figure 6:
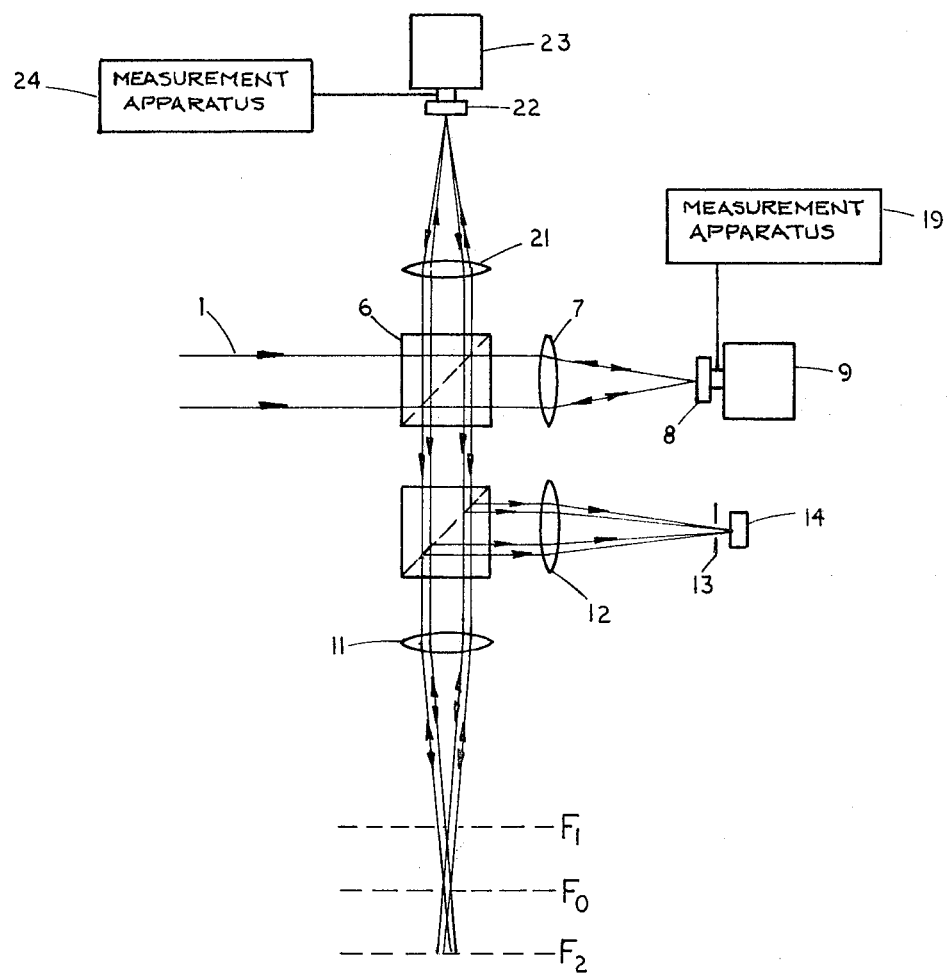

FIG. 6 is a schematic diagram particularly illustrating a modification of the optical system in FIG. 3, which makes possible the measurement of the inclination of the plane of the device being measured.

Figure 7:
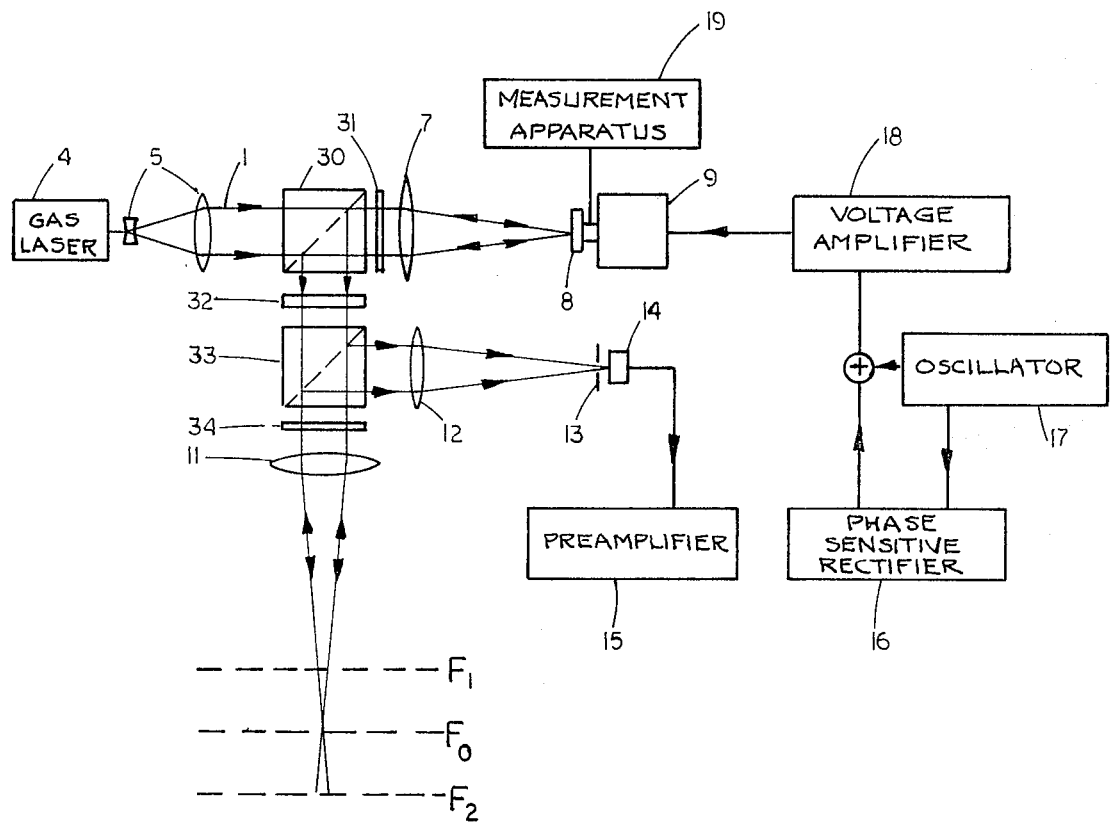

FIG. 7 is a schematic diagram illustrating a preferred system which utilizes the polarized light from a laser in a most efficient manner.

DETAILED DESCRIPTION OF THE INVENTION

Figure 1:
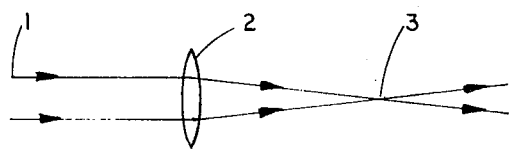
FIG. 1 is a schematic of a lens focusing a collimated light beam.

Description and Explanation of the Schematic in FIG. 1

While the apparatus has application for a wide range of radiation sources, the following description is taken by way of example with respect to an optical measuring system. The term "radiant energy" as used herein includes, but is not limited to, electromagnetic energy of all frequency ranges.

A light source such as tungsten bulb, xenon bulb, light-emitting diode, laser diode, or other source of radiant energy, and most preferably a gas laser, provides optical energy for the collimated beam 1 in FIG. 1. A lens 2 suitably corrected to minimize aberrations will bring the radiant energy to focus 3. For the case where the radiant energy is nearly monochromatic, the spot diameter at the focal point of the lens is given by spot diameter = $4\lambda f/(\pi d)$ where $\lambda$ is the wave length of the light, $f$ is the focal length of the lens, and $d$ is the diameter of the collimated beam of radiant energy. Since $(f/d) = f/no.$ of the lens, the above equation can be rewritten as spot diameter = $(4\lambda/\pi)(f/no.)$. Thus, the relation establishes the fact that the spot diameter achievable with optical means can be as small as several wave lengths with a suitably fast lens.

Figure 2:
FIG. 2 is a schematic of an exploded view of the light at the focal point.

Description and Explanation of the Schematic in FIG. 2

FIG. 2 shows schematically a highly magnified view of the light distribution on the optical axis at the focal point for an incident collimated light beam.

The point at which the light intensity is 20 percent of that at the focal point is denoted as the depth of focus. Quantitatively, the depth of focus is given by depth fof focus = $\lambda(f/no.)^2$ where $\lambda$ is the wave length of the radiant energy and $f/no.$ is the ratio of the focal length divided by the diameter of the incident light beam. Thus, referring to FIG. 2, the principle underlying the operation of the invention will be given.

In the present invention, the focus of a beam of radiant energy oscillates back and forth along the optical axis at some frequency $f_o$. By monitoring the first harmonic of the radiant energy reflected from a test surface which is near the focus, one obtains information relative to the phase and offset of the test surface and the center of oscillation of the focal point. By modulating the focal point by an amount nominally equal to the depth of focus, the first harmonic of the reflected radiant energy is proportional to the first derivative of the curve given in FIG. 2. Thus, there is zero first harmonic when the center of oscillation coincides with the focal point. As the center of oscillation departs from the test surface, the amplitude of the first harmonic of the reflected radiant energy is proportional to the displacement, and the phase depends on the direction of the displacement. By moving the focus of the radiant energy by one means or another so that the focus always coincides with the test surface, the position and motion of the test surface can be ascertained. Furthermore, by servoing the focus of the radiant energy using negative feedback based on an error signal derived from the amplitude and phase of the first harmonic of the radiant energy reflected by the test surface, the distance measurement is extremely insensitive to variations in the output of the light source as well as to variations in the reflectivity of the test surfaces. Additionally, the measurement does not require that the test surface be normal to be incident light. Moreover, since the signal is contained in the light modulated at a frequency $f_o$, the sensor is insensitive to ambient light changes. In addition, only one photodetector is required to measure the radiant energy reflected by the test surface. The above features accrue, since the detecting scheme uses the first spatial derivative of the shape of the light distribution at the focus of the radiant energy.

Description and Explanation of the Optical System in FIG. 3

Referring to FIG. 3, there is here illustrated in detail an optical system useful in an embodiment of the invention.

A part of a collimated beam of radiant energy 1 passes through a beam splitter cube 6. The transmitted beam is focused by lens 7 onto the front surface mirror 8. Mirror 8 is placed at the focal point of lens 7. The radiant energy reflected by mirror 8 is recollimated by lens 7. A part of the radiant energy collimated by lens 7 is reflected by the beam splitter 6 such that the collimated beam enters the second beam splitter 10. A part of the radiant energy is transmitted by the beam splitter so that the collimated beam is focused by lens 11. Placing a test surface near the focus $F_o$ of lens 11 will cause a reflected beam of radiant energy to re-enter lens 11. The beam splitter 10 and lens 12 direct a part of the radiant energy reflected by a surface near $F_o$ onto the photodetector 14. An aperture 13 is placed in front of the photodetector.

$F_1$ denotes a plane in front of the focus $F_o$. $F_2$ denotes a plane behind the focus $F_o$.

The mirror 8 is attached to a position translater 9 such as a piezoelectric transducer, a motor-driven fixture, or other device. Mirror 8 oscillates along its normal at a fixed frequency. In addition, the position of the center of oscillation of mirror 8 can be varied with an appropriate electrical input to the translater 9. The position is adjusted by the error signal to set the mirror to produce a nul error signal. The translator 9 contains a measuring means which measures this position, which is directly related to the position of the test surface.

The oscillation of mirror 8 causes the focal point of the radiant energy focused by lens 11 to oscillate along the optical axis of lens 11. The ratio of the amplitude of oscillation of the focal point at $F_o$ to the amplitude of oscillation of mirror 8 is related by the square of the ratio of the focal length of lens 11 to the focal length of lens 7. Thus, the oscillation at $F_o$ is equal to $(f_{11}/f_7)^2$ × oscillation of mirror 8. The optical magnification or, in some cases, demagnification effected by this embodiment is an extremely crucial auxiliary feature facilitating the implementation of both very-high-accuracy sensors and large dynamic-range sensors. Since the technique measures the radiant energy reflected by the test surface passing through an aperture 13, only one photodetector 14 is required.

Description and Explanation of FIGS. 4 (a) and (b) and FIG. 5

FIG. 4 (a) shows schematically the first harmonic output of the photodetector when the test surface is in front of $F_o$. The amplitude $A_1$ is proportional to the displacement of the center of oscillation from the test surface. FIG. 4 (b) shows the phase reversal that occurs when the test surface is displaced behind $F_o$. The amplitude $A_2$ is proportional to the magnitude of the displacement.

FIG. 5 depicts the D.C. voltage resulting if the output of the photodetector 14 is synchronously demodulated with a phase-sensitive rectifier and the rectified signal is passed through a low-pass filter. The distance axis denotes the distance between the test surface and the center of oscillation of the focus. When the test surface is coincident with the center of oscillation, there is zero D.C. output. When the test surface is in front of or behind the center of oscillation, a D.C. voltage whose magnitude is proportional to the offset and whose sign depends on the direction of the offset is produced by the phase-sensitive rectifier.

Referring back to FIG. 3, a preamplifier 15 provides voltage amplification and impedance matching of the electrical output of the photodetector 14. The phase-sensitive rectifier 16 synchronously demodulates the output of the preamplifier 15. The output of the reference oscillator 17 is used to drive the phase-sensitive rectifier as well as to provide the oscillation for the mirror 8 through the transducer 9. The voltage amplifier 18 applies the sum of the A.C. from the oscillator 17 and the D.C. output of the phase-sensitive rectifier 16 to the transducer 9 which then moves mirror 8 in accordance with the voltages applied to it. The measurement apparatus 19 indicates the D.C. position of mirror 8. This distance is directly related to the position of the test surface.

Description and Explanation of FIG. 6

In many applications, it is desirable to measure not only the distance of the test surface with respect to some fixed plane but also to measure the angle of the normal to the test surface with respect to some reference line. The optical sensor described in this invention can be configured in the embodiment depicted in FIG. 6. Lens 21, mirror 22, transducer 23, and measuring apparatus 24 provide a second beam of focused radiant energy at the test surface. The optical axis of lens 21 is decentered with respect to the collimated beam incident on it. This offset provides the spacing adjust between the two beams of radiant energy falling on the test surface. The frequency of oscillation of mirror 22 is different from the frequency of oscillation of mirror 8. The use of different frequencies permits discrimination of the distance information received at the photodetector 14. The use of different modulation frequencies permits the use of a single photodetector for both distance measurements. The use of two different modulation frequencies eliminates the possibility of optical cross talk between the two distance measurements. The difference in the distance measurements is proportional to the tilt of the test surface normal with respect to the optical axis of lens 11. The dual-probe configuration of this sensor is an important modification of the preferred embodiment.

Description and Explanation of FIG. 7

FIG. 7 shows a schematic of the optical system and a block diagram of the electrical apparatus of a preferred embodiment of the invention which is highly efficient as to energy use. The output beam of a gas laser 4 is expanded and collimated by the beam expander 5. The beam 1 enters the polarization beam splitter 30. A quarter-wave phase retardation plate 31 is located between the beam splitter 30 and lens 7. The reason for using a polarization beam splitter in conjunction with the quarter-wave phase retardation plate is to provide minimum loss of radiant energy at the beam splitter. This configuration increases the light throughput efficiency by about a factor of four over a conventional 50—50 beam splitter for a linearly polarized incident beam 1. The retardation plate 31 has its optic axis oriented at 45° with respect to the direction of polarization of the incident light. The linearly polarized light incident on 31 is thusly converted to circularly polarized light.

Upon reflection at mirror 8, the handedness of the circular polarization is changed. Thus, upon passing back through the phase retardation plate 31, the polarization of the reflected light is rotated by a total of 90° so that all the light which was transmitted by the polarization beam splitter 30 will now be reflected. A half-wave phase retardation plate 32 is placed between the beam splitter 30 and a beam splitter 33; it rotates the plane of polarization of the light by 90° so that all the light is transmitted by the polarization beam splitter 33.

The quarter-wave retardation plate 34 placed between the beam splitter 33 and the lens 11 functions similarly to plate 31, and enables all the light, including that reflected from the test object, to be passed through the lens 11 to the photodetector 14. Thus, except for accidental losses due to scattering and absorption, the light fed into the instrument from the laser 4 is available at the photodetector 14. The same scheme can be used in the modification shown in FIG. 6.

As in FIG. 3, the preamplifier 15 provides voltage amplification and impedance matching of the electrical output of the photodetector 14. The phase-sensitive rectifier 16 synchronously demodulates the output of the preamplifier 15. The output of the reference oscillator 17 is used to drive the phase-sensitive rectifier as well as to provide the oscillation for the mirror 8 through the transducer 9. The voltage amplifier 18 applies the phase-sensitive rectifier 16 to the transducer 9 which then moves mirror 8 in accordance with the voltage applied to it. The measurement apparatus 19 indicates the D.C. position of mirror 8. This distance is directly related to the position of the test surface.

While the drawings illustrate the feeding of the signals from the photodetector into measurement apparatus, it is obvious that they could be fed into servo mechanisms which could maintain the test surface at the focal position, so that the device could be used, say, as a control for a cutting operation, or for any other mechanical operation on the object of the focal point.

The specific embodiments of the invention herein disclosed may obviously be modified without departing from the scope of the invention as defined in the claims.

What is claimed is:

1. An optical noncontacting surface sensor for measuring the distance between a reflecting test surface and a predetermined reference plane comprising (A) a source of radiant energy; (B) means for focusing at least a portion of the radiant energy on the reflecting surface; (C) means for modulating said focusing of said portion of radiant energy at a desired frequency along its optical path; (D) means for collecting radiant energy reflected from the test surface onto a single photodetector; (E) means for monitoring the characteristic of said collected radiant energy to obtain information which when processed will demodulate and amplitude detect the distance between the test surface and the reference plane.

2. The apparatus of claim 1, in which the modulating means is a mirror which oscillates along the optical axis about the focus point of the energy delivered to it.

3. The apparatus of claim 1, in which there are two means for modulating the focusing of two portions of said radiant energy at two different frequencies, each of the two modulated beams reflected by a test surface, the two reflected beams returning to a separate photodetector when the test surface is at an ordinary point, a separate slice of frequencies received in the single photodetector and the elements duplicated separate measuring devices, whereby the energy for calculation of the distance between the test surface and the reference plane can be determined.

4. The apparatus of claim 1, in which the modulating means is a mirror which oscillates at different frequency along the optical axis about the focus point of the energies delivered to them.

5. The apparatus of claim 1, in which the energy source is a laser.

6. The apparatus of claim 1, in which the energy source is a gas laser which emits polarized light which is directed into a beam expander which expands the light into a collimated beam, the collimated beam passes into a first polarization beam splitter which delivers a portion of the light through a quarter-wave retardation plate into a first lens which focuses the now circularly polarized light onto an oscillating mirror which serves both to modulate the light along its optical axis at a desired frequency and to change the handedness of the light so that the polarization of the reflected light is rotated by a total of 90° so that all of the light incident on the beam splitter is delivered, through a half-wave phase retardation plate, to a second polarization beam splitter which directs a portion of the light through a second lens onto a photodetector, and a portion of the light through a second quarter-wave phase retardation plate through a third lens onto the test surface, and further the characteristic of the test surface to the photodetector is such that a substantially all of the light from the laser minus added at losses, is delivered to the photodetector.

7. The apparatus of claim 1, in which (A) is a source of radiant energy, a beam of collimated light, (B) is said means of focusing said portion and for changing energy from the test surface comprises first a lens means delivering the first lens (C) is a characteristic of an oscillating mirror energy comprises a collimated beam which is focused to a point to form the first said is clear a position return a mirror which oscillates along the optical path at a distance of one eighth at about the focus point of the energy delivered to it at and reflected light is an oscillating beam detector through the it is a beam splitter in to which the collimated beam splitter which delivers a portion of the one modulated eighth from the it is a beam splitter the through the first lens on to the test surface which delivers a portion of the first light reflected from the mirror the test surface through (D) is a means for collecting the first of the test surface light which is in the laser beam from the focus and the light on the test also photodetector.